US006470938B1

(12) United States Patent
Yokota et al.

(10) Patent No.: US 6,470,938 B1
(45) Date of Patent: Oct. 29, 2002

(54) PNEUMATIC TIRE HAVING LAYER OF RUBBER DISPOSED BETWEEN THE BODY AND BELT PACKAGE

(75) Inventors: Hidetoshi Yokota, Kawasaki (JP); John Daniel Clothiaux, Hudson, OH (US); Andrew Karl Reinhardt, Akron, OH (US); Steven Michael Vossberg, Medina, OH (US)

(73) Assignee: Bridgestone/Firestone North American Tire, LLC, Nashville, TN (US)

( * ) Notice: Subject to any disclaimer, the term of this patent is extended or adjusted under 35 U.S.C. 154(b) by 0 days.

(21) Appl. No.: 09/559,705

(22) Filed: Apr. 27, 2000

(51) Int. Cl.[7] .............................................. B60C 09/018
(52) U.S. Cl. ........................ 152/526; 152/532; 152/538; 152/555
(58) Field of Search ................................ 152/525, 526, 152/532, 537, 555, 519, 538

(56) References Cited

U.S. PATENT DOCUMENTS

| 3,525,654 A | | 8/1970 | Uotani et al. ................ 156/124 |
| 3,583,463 A | * | 6/1971 | O'Neil ......................... 152/535 |
| 3,717,191 A | | 2/1973 | Harrington et al. .......... 152/361 |
| 3,763,913 A | | 10/1973 | French et al. ............ 152/361 R |
| 4,957,799 A | | 9/1990 | Miyamoto et al. ........... 428/114 |
| 4,962,802 A | | 10/1990 | Rohde .......................... 152/532 |
| 5,335,707 A | | 8/1994 | Sano et al. .................. 152/543 |
| 5,458,173 A | * | 10/1995 | Yamashita .............. 152/209.14 |
| 5,560,791 A | | 10/1996 | Kajita ..................... 152/209 R |
| 5,645,662 A | * | 7/1997 | Terada ......................... 152/532 |
| 5,879,485 A | * | 3/1999 | Sakamoto ................... 152/554 |
| 6,257,290 B1 | * | 7/2001 | Sakamoto .............. 152/209.16 |
| 6,305,451 B1 | * | 10/2001 | Ueyoko ....................... 152/526 |

FOREIGN PATENT DOCUMENTS

| EP | 0 066225 | * | 5/1982 |
| JP | 06115309 | * | 4/1994 |

* cited by examiner

Primary Examiner—Michael W. Ball
Assistant Examiner—Justin Fischer
(74) Attorney, Agent, or Firm—John M. Vasuta; Michael Sand; Fred H. Zollinger, III (57) ABSTRACT

A pneumatic tire includes a body, a belt package, and a tread package. The tire includes a layer of rubber disposed between the body and the tread package. The layer of rubber creates a thickness of between about 0.5 millimeters and about 1.5 millimeters between the cords in the body and the cords in the belt package. The layer of rubber is fabricated from a rubber having a stiffness greater than the rubber in the body of the tire. This configuration provides a tire having improved cornering coefficient, reduced vibrational levels, and less coarse road noise with only a small increase in rolling loss.

1 Claim, 8 Drawing Sheets

PNEUMATIC TIRE HAVING LAYER OF RUBBER DISPOSED BETWEEN THE BODY AND BELT PACKAGE

BACKGROUND OF THE INVENTION

1. Technical Field

This invention generally relates to pneumatic tires and, more particularly, to a pneumatic tire having an extra layer of rubber that improves tire performance. Specifically, the present invention is directed to a pneumatic tire having an increased rubber gage between the tire body and the belt package to improve the performance of the tire.

2. Background Information

A pneumatic tire used on a typical automobile or truck includes a basic tire carcass member that may have reinforcing cords radially disposed in its body. These reinforcing cords typically radiate out from the center of rotation of the tire. A reinforcing belt package may be positioned on the outer surface of the carcass. The reinforcing belt package may include a layer or layers of reinforcing cords that give the tire strength and durability. Tires also include a tread package having the tire tread that is positioned outside the reinforcing belt package.

In recent times, automobile manufacturers desire tires that are tuned for a specific automobile model. This requirement has developed in part because current suspensions are sensitive enough that tires can make noticeable changes in the ride and handling of an automobile.

Tire manufacturers tune tires by varying the materials that are used in the tire and by varying the configuration of the elements within a tire. Various tire configurations are known for improving characteristics such as road noise, ride, rolling resistance, strength, vibration, and cornering force. Although various tires are known in the art having configurations directed to one or more of these characteristics, a tire is desired that has an improved cornering coefficient, reduced tire vibration levels, reduced coarse road noise with only a small increase in rolling resistance.

SUMMARY OF THE INVENTION

In view of the foregoing, the present invention provides a pneumatic tire configuration having increased rubber gage between the body ply and the belt package. The rubber gage is sized to improve the cornering coefficient of the tire while reducing vibrational levels. The increased gage also improves the coarse road noise of the tire. These advantages are achieved without an undesirable increase in rolling loss.

The invention provides a pneumatic tire, including a body having at least one layer of body cord; a belt package having at least one layer of reinforcing cord; a tread package connected to the belt package; and a gage of rubber disposed between the belt package and the body; the gage of rubber spacing the body cord from the reinforcing cord a distance in the range of 0.5 millimeters to 1.5 millimeters.

The invention also provides a pneumatic tire having an extruded sidewall that forms the increased rubber gage between the body ply and the belt package. In one embodiment, the extended sidewall extends all the way across the tire to connect both sidewalls. In another embodiment, each sidewall has an insert that extends partially across the tire to form a pair of opposed belt edge inserts that increase the rubber gage between the body ply and belt packages at the edges of the tire.

The invention provides an improved pneumatic tire having a body, a belt package and a tread package. The improvement including a layer of rubber disposed between the body and the belt package wherein the thickness of the layer of rubber is between 0.5 millimeters and 1.5 millimeters.

BRIEF DESCRIPTION OF THE DRAWINGS

Preferred embodiments of the invention, illustrative of the best mode in which applicants have contemplated applying the principles of the invention, are set forth in the following description and are shown in the drawings and are particularly and distinctly pointed out and set forth in the appended claims.

Similar numerals refer to similar parts throughout the drawings.

DESCRIPTION OF THE PREFERRED EMBODIMENT

The tire of the present invention is indicated generally by the numeral 10 in the accompanying drawings. Tire 10 generally includes a body 12, a belt package 14, and a tread package 16. As is known in the art, body 12 includes a pair of sidewalls 18 having bead rings 20 and apex fillers 22. Tire 10 also includes an innerliner 24 that creates a fluid-impervious chamber 26 in tire 10 when tire 10 is mounted on a tire rim (not shown).

Figure 1:
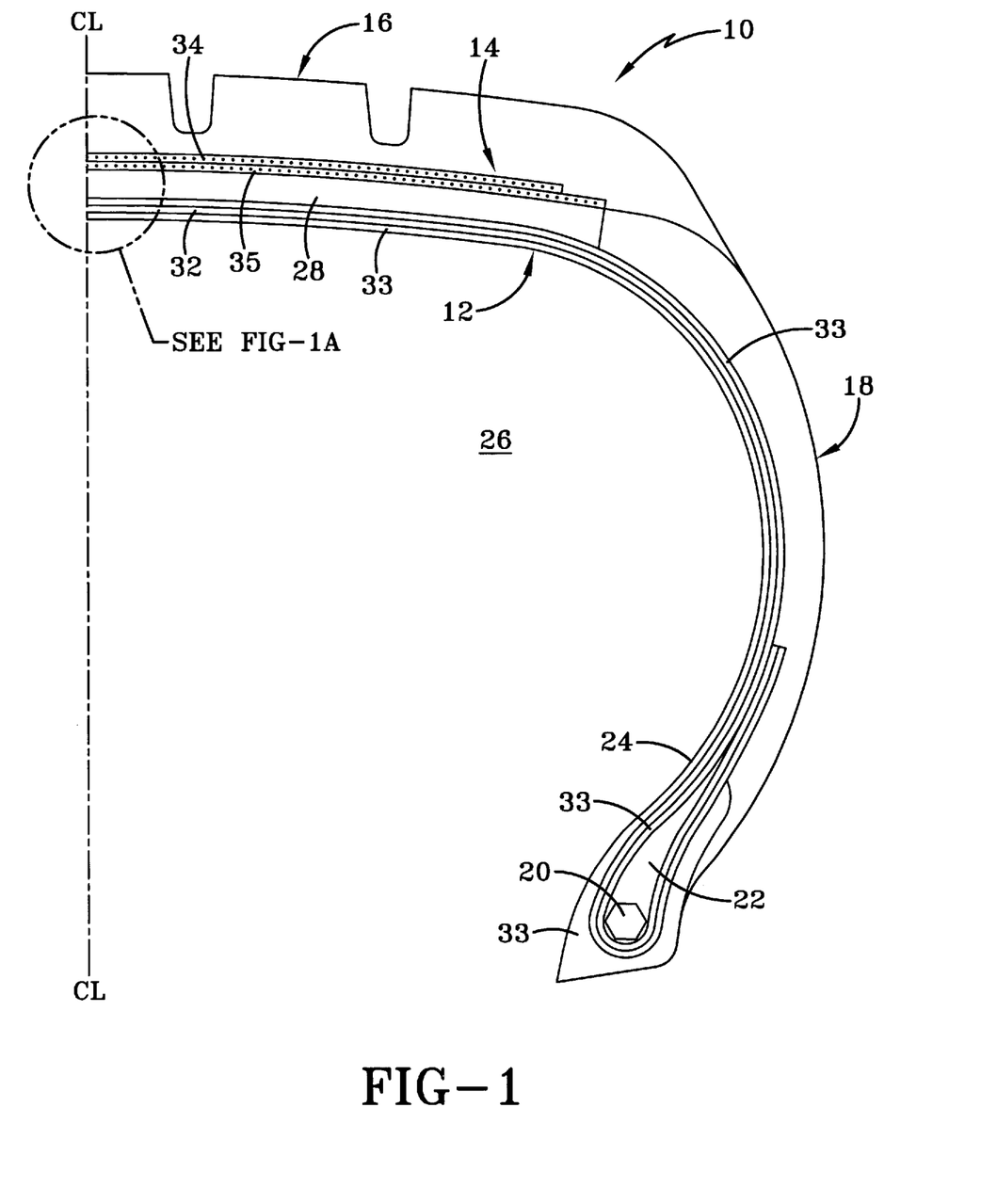
FIG. 1 is a cross sectional view of half of a pneumatic tire having the increased rubber gage between the body and belt package according to the concepts of the present invention with the other half of the tire being substantially a mirror image of the half depicted.
Figure 1A:
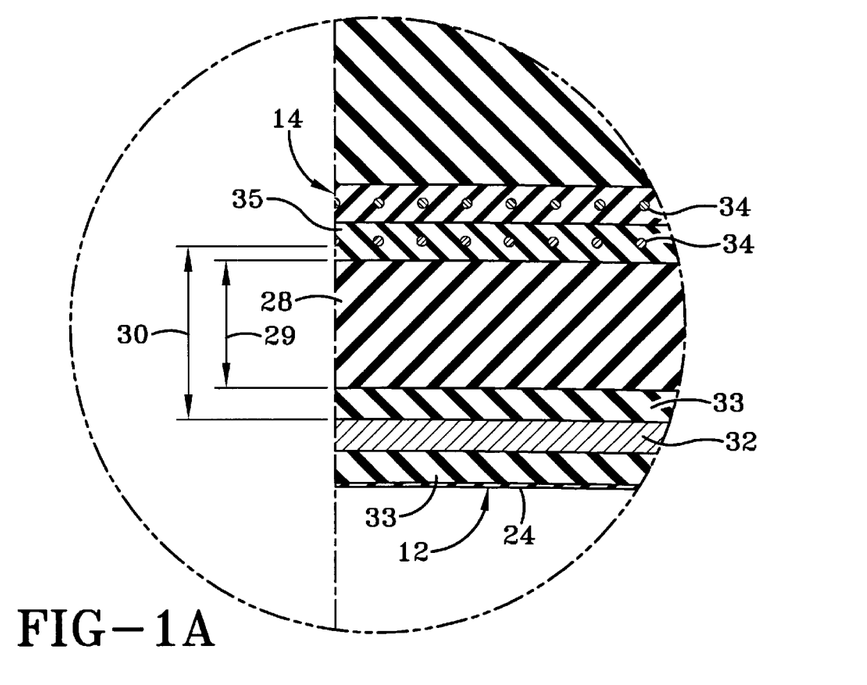
FIG. 1A is an enlarged view of the encircled portion of FIG. 1.

In accordance with the objectives of the present invention, tire 10 includes a layer of rubber, indicated by the numeral 28, disposed between body 12 and belt package 14. As is known in the art, belt package 14 includes a plurality of reinforcing cords 34 embedded within or substantially surrounded by rubber 35. Body 12 includes at least one layer of body cord 32 embedded within or substantially surrounded by rubber 33. In the preferred embodiment of the present invention, layer 28 has a thickness of between a first thickness less than 0.5 millimeters and a second thickness less than 1.5 millimeters as indicated by the dimension line labeled by the numeral 29 (FIG. 1A). In the embodiment of the invention depicted in FIG. 1, thickness 29 spaces the body cords 32 from reinforcing cords 34 by a distance of between about 0.5 and about 1.5 millimeters as indicated by dimension line 30. Dimension line 30 includes the entire thickness 29 of layer 28, a portion of the rubber 33 that encases cords 32, and a portion of the rubber 35 that encases cords 34. It has been found that layer 28 spacing cords 32 from cords 34 by dimension 30 improves the cornering characteristics of tire 10 while not degrading the rolling resistance of tire 10. Such results were unexpected because it was generally believed that the rolling resistance of tire 10 would increase with rubber layer 28 positioned between body 12 and belt package 14. In fact, tests show that the rolling resistance only undesirably increases once thickness 29 of layer 28 reaches 2 millimeters. It is thus an important aspect of the present invention that thickness 30 remains between about 0.5 and about 1.5 millimeters.

Inserting layer 28 in tire 10 to form dimensions discussed above improves the cornering coefficient, tire vibrational levels, and coarse road noise of tire 10 while not significantly degrading the rolling resistance of tire 10. Layer 28 improves these characteristics independent of the tread pattern used with tire 10 and the aspect ratio of tire 10.

In accordance with another objective of the present invention, layer 28 may be fabricated from a rubber that is stiffer than the rubber used in body 33. The rubber of layer 28 may be substantially same as the rubber used in belt package 14.

Layer 28 may be manufactured separately from body 12 and belt package 14 and positioned in the desired position during the manufacturing process. In the preferred embodiment of the invention, layer 28 extends substantially the same width as belt package 14. Layer 28 may, however, be formed in other widths.

Figure 2:
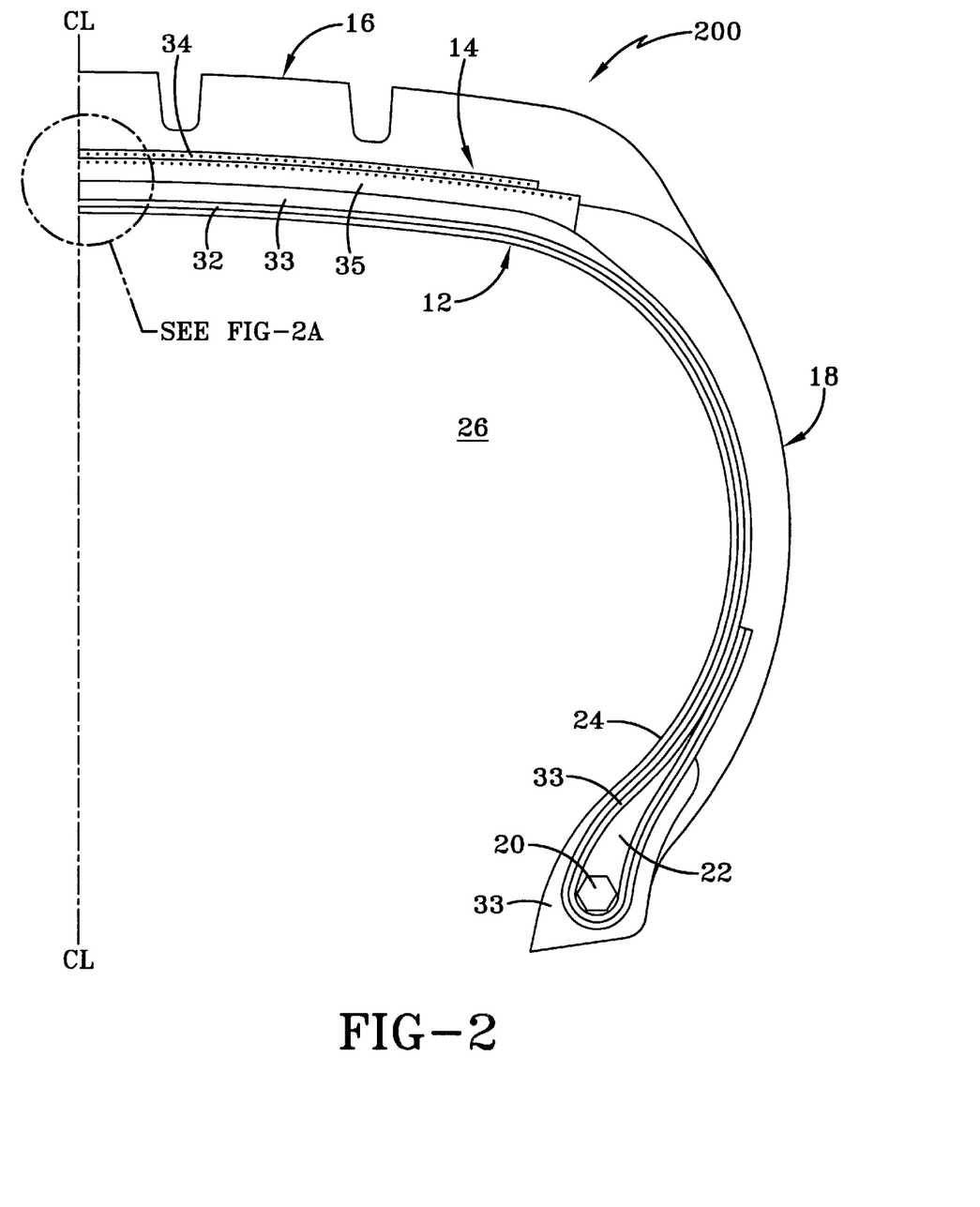
FIG. 2 is a cross sectional view similar to FIG. 1 showing an alternative embodiment of the present invention.
Figure 2A:
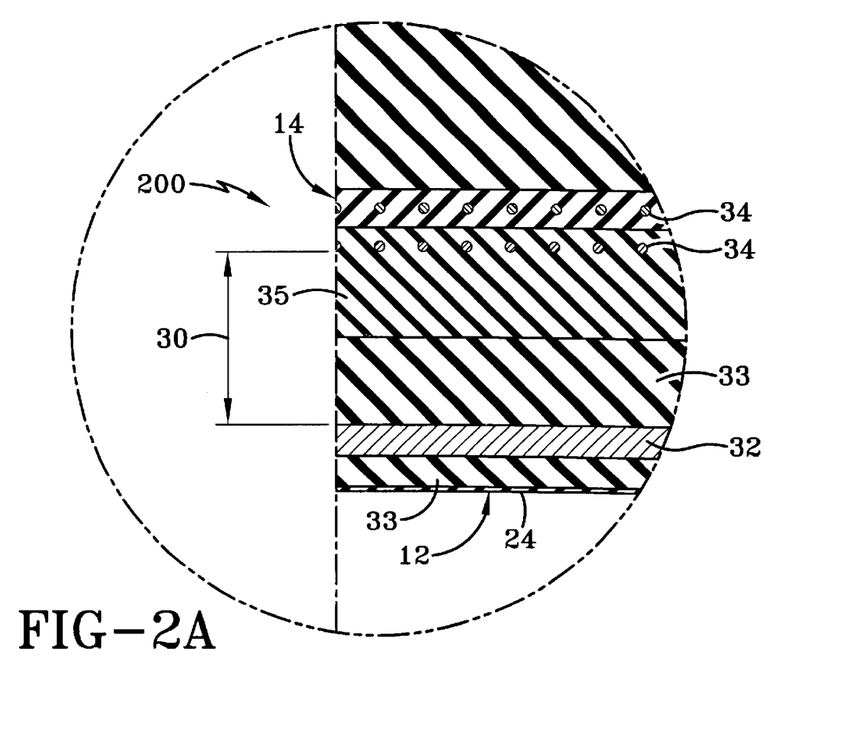
FIG. 2A is an enlarged view of the encircled portion of FIG. 2.

An alternative embodiment of the tire having the increased rubber gage between the body and belt package is indicated generally by the numeral 200 in FIGS. 2 and 2A. In accordance with one of the objectives of the present invention, tire 200 includes extra rubber between reinforcing cords 34 and body cords 32 such that cords 32 are spaced from cords 34 by about 0.5 and about 1.5 millimeters as indicated by the dimension line 30. The extra thickness of rubber in this embodiment of the invention is achieved by extending rubber 35 surrounding cords 34 downwardly and extending rubber 33 surrounding cords 32 upwardly. The proportions of the thickness of rubber 33 and rubber 35 may vary with a preferred embodiment depicted in FIGS. 2 and 2A where rubber 33 is extended 40 to 60 percent of the distance.

Figure 3:
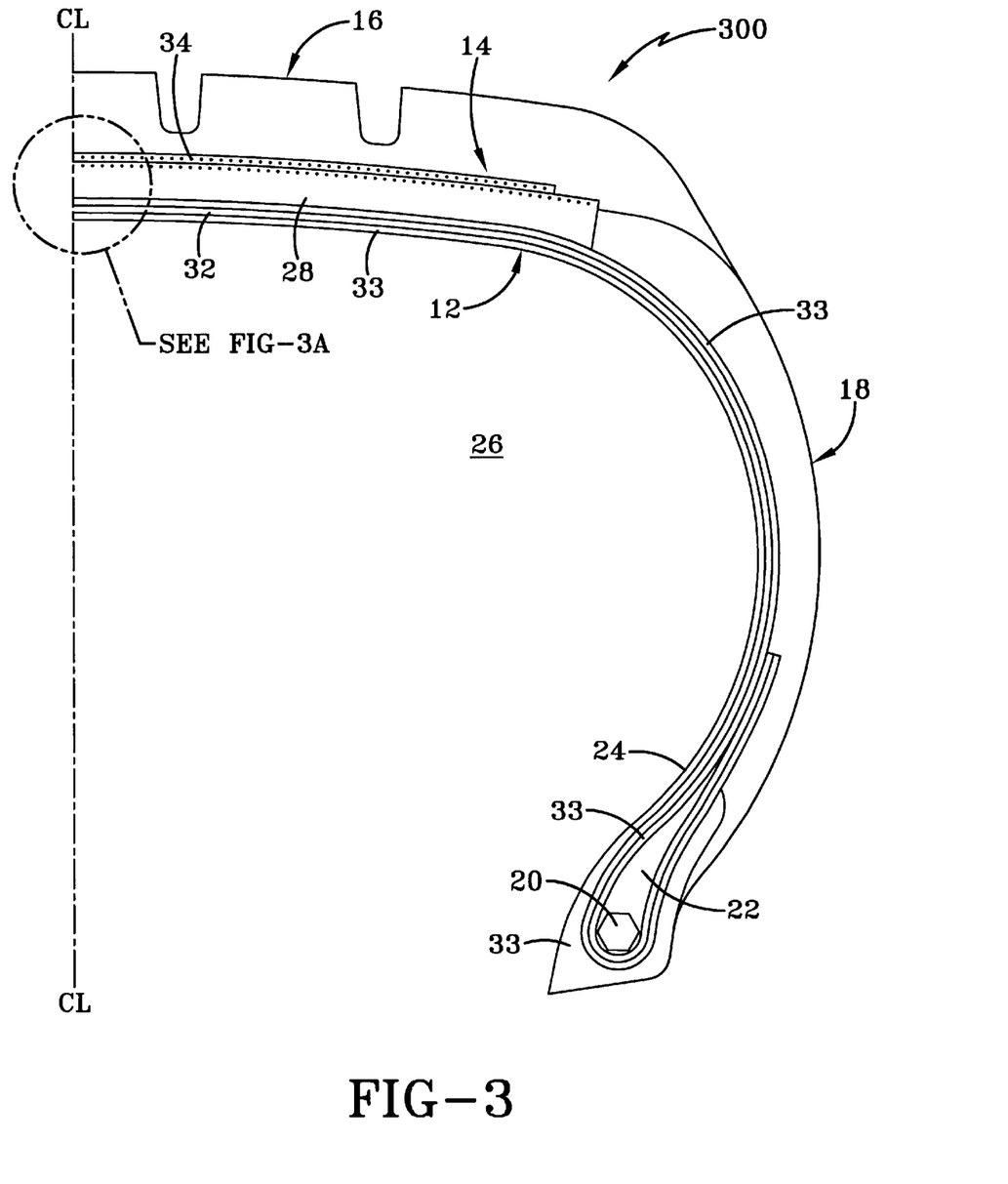
FIG. 3 is a cross sectional view similar to FIG. 1 showing another alternative embodiment of the present invention.
Figure 3A:
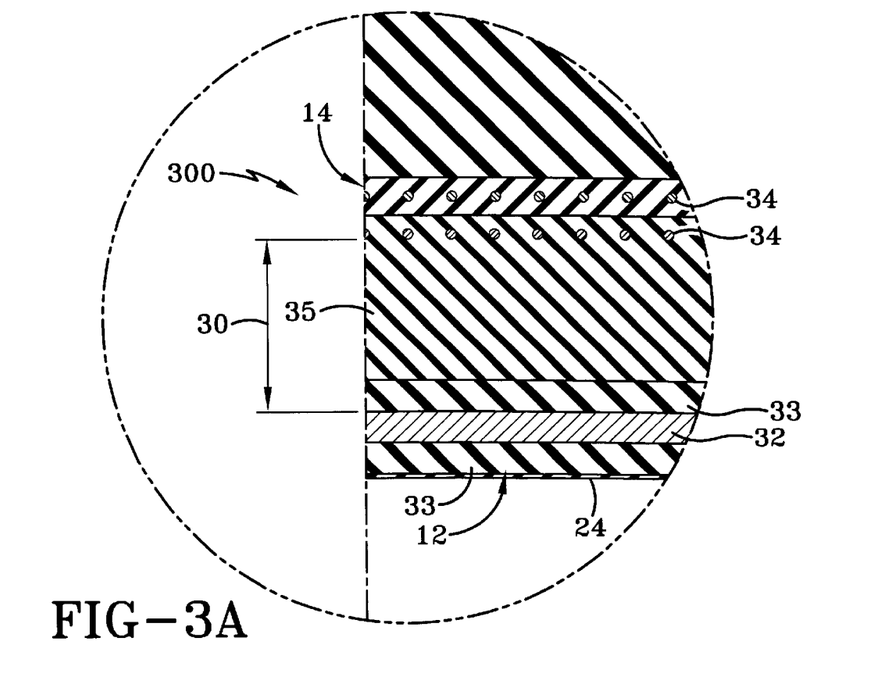
FIG. 3A is an enlarged view of the encircled portion of FIG. 3.

Another alternative embodiment of the tire having the extra gage of rubber is indicated generally by the numeral 300 in FIG. 3. In accordance with one of the objectives of the invention, cords 32 are separated from cords 34 by an extra gage of rubber such that cords 32 are separated from cords 34 by a lot distance between about 0.5 and about 1.5 millimeters as indicated by the dimension line 30. In this embodiment, distance 30 is achieved by extending rubber 35 surrounding cords 34 downwardly until it abuts rubber 33 encapsulating cords 32.

Figure 4:
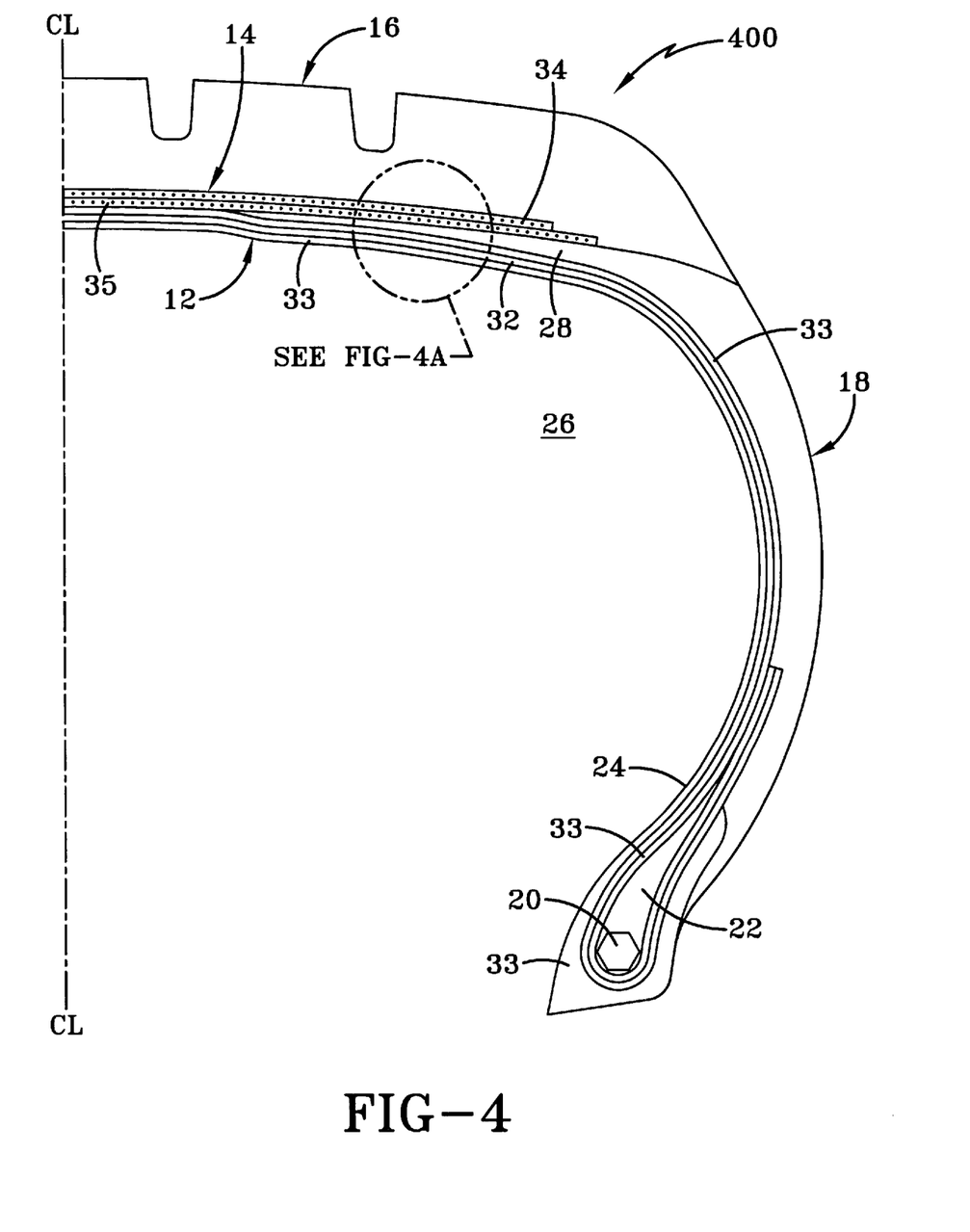
FIG. 4 is a view similar to FIG. 1 showing a further alternative embodiment of the present invention.
Figure 4A:
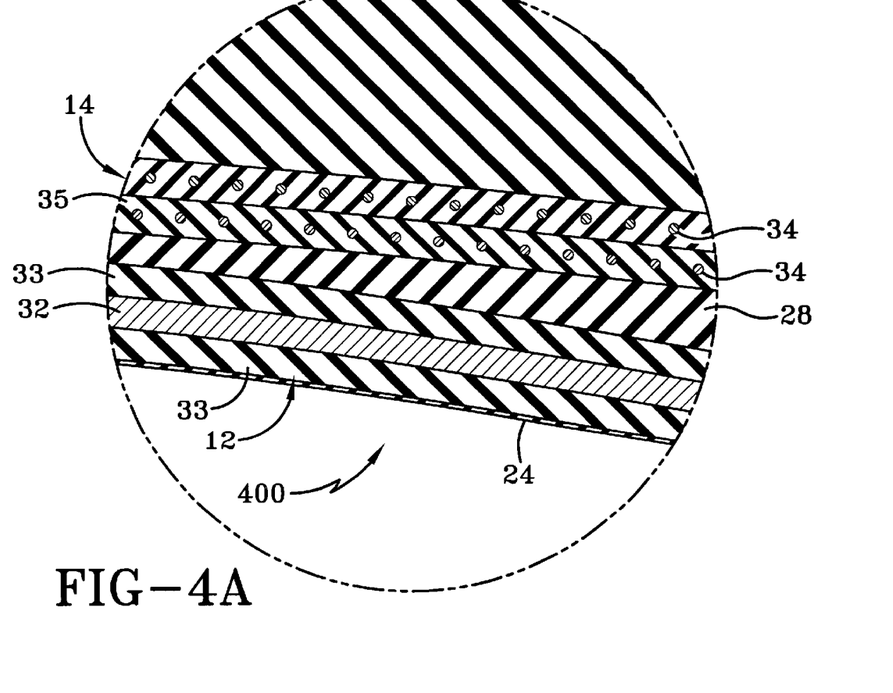
FIG. 4A is an enlarged view of the encircled portion of FIG. 4.

A further embodiment of the tire of the present invention is indicated generally by the numeral 400 in FIGS. 4 and 4A. The structure of embodiment 400 is similar to the structure of tire 10 depicted in FIGS. 1 and 1A except that the extra gage of rubber does not extend entirely across tread package 16. As shown in FIG. 4, the extra gage of rubber only extends partially across tread package 16 from side wall 18 towards the center line (CL) of tire 400. In the preferred embodiment, gage 28 extends approximately two-thirds of the distance from sidewall 18 to centerline CL. Extra gage 28 cooperates with rubber 33 and 35 to space cords 32 from cords 34 a distance of between about 0.5 and about 1.5 millimeters at their widest portion with the distance tapering as the cords move toward the center of tire 400.

Figure 5:
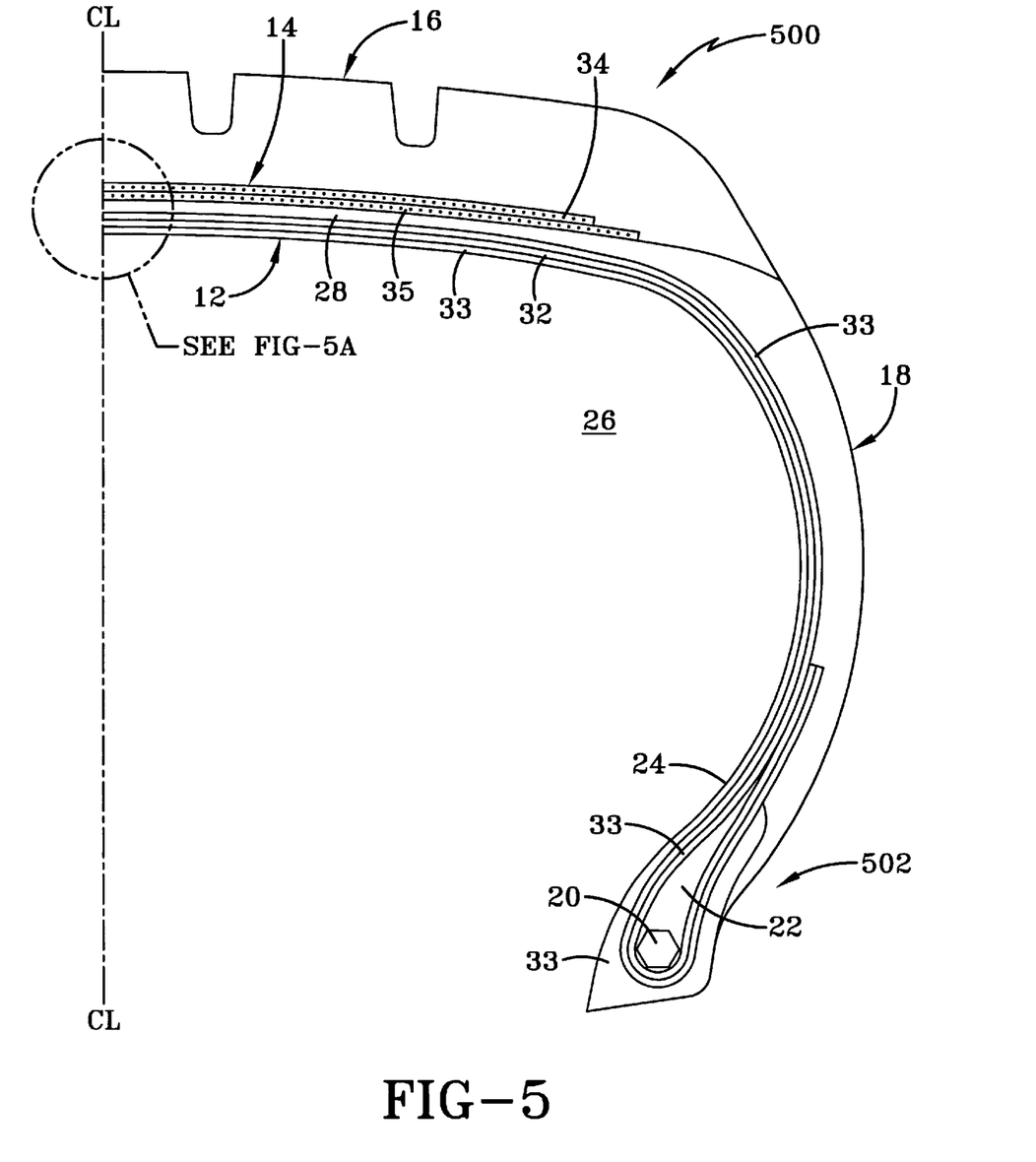
FIG. 5 is a view similar to FIG. 1 showing yet another alternative embodiment of the present invention.
Figure 5A:
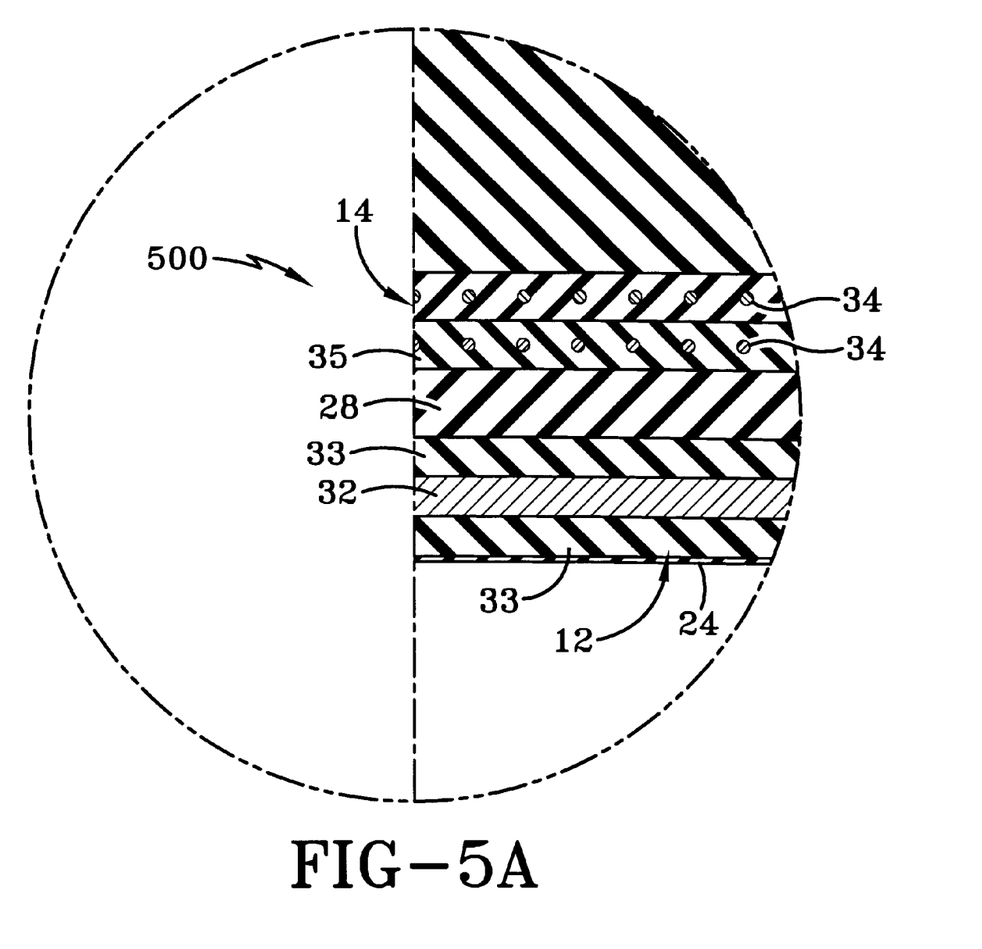
FIG. 5A is an enlarged view of the encircled portion of FIG. 5.

FIG. 5 depicts yet another embodiment of a tire of the present invention as indicated generally by the numeral 500. Tire 500 has a similar structure to 5 tire 10 except that rubber 28 is formed integrally with the rubber of sidewall 18 and extends entirely across tire from an inner location indicated by the numeral 502 to the opposite inner location on the other side of the tire. Layer 28 thus may be extruded or calendered as a single layer of rubber and draped entirely across the width of tire 500. Layer 28 is configured to provide similar spacing as tire 10 depicted in FIGS. 1 and 1A.

Accordingly, the improved tire having increasing gage below the belt package is simplified, provides an effective, safe, inexpensive, and efficient device which achieves all the enumerated objectives, provides for eliminating difficulties encountered with prior devices, and solves problems and obtains new results in the art.

In the foregoing description, certain terms have been used for brevity, clearness and understanding; but no unnecessary limitations are to be implied therefrom beyond the requirement of the prior art, because such terms are used for descriptive purposes and are intended to be broadly construed.

Moreover, the description and illustration of the invention is by way of example, and the scope of the invention is not limited to the exact details shown or described.

Having now described the features, discoveries and principles of the invention, the manner in which the improved tire having increasing gage below the belt package is construed and used, the characteristics of the construction, and the advantageous, new and useful results obtained; the new and useful structures, devices, elements, arrangements, parts and combinations, are set forth in the appended claims.

What is claimed is:

1. A pneumatic tire, comprising:

a body including at least one layer of body cords; a belt package having at least one layer of reinforcing cords; a tread package connected to the belt package; and a gage of rubber disposed between the belt package and the body; the gage of rubber spacing the body cords from the reinforcing cords a distance in the range of 0.6 millimeters to 1.5 millimeters;

the body further including a pair of sidewalls; each of the sidewalls having a sidewall rubber layer;

the gage of rubber disposed between the belt package and the body being integrally connected to each of the sidewall rubber layers;

the tire having a centerline; the gage of rubber extending only partially toward the centerline from the edge of the tire;

each gage of rubber being tapered;

the tire having a maximum width;

each gage of rubber extending from the sidewall toward the centerline; the gage of rubber extending two-thirds of the distance to the centerline from the sidewall.

* * * * *